United States Patent
Kalman et al.

(10) Patent No.: US 6,583,995 B2
(45) Date of Patent: Jun. 24, 2003

(54) PERMANENT MAGNET GENERATOR AND GENERATOR CONTROL

(75) Inventors: Gabor Kalman, Palos Verdes, CA (US); Colin Huggett, Torrance, CA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/746,437

(22) Filed: Dec. 21, 2000

(65) Prior Publication Data

US 2002/0110007 A1 Aug. 15, 2002

(51) Int. Cl.[7] ............... H02J 3/00; H02P 5/34
(52) U.S. Cl. ............. 363/35; 318/801; 318/254; 322/10
(58) Field of Search ............ 363/35, 34, 39, 363/40, 41, 48, 56, 50, 52, 53, 164, 43, 45, 163, 37; 322/61, 10, 23; 318/800, 801, 434, 807, 254

(56) References Cited

U.S. PATENT DOCUMENTS

| | | | | |
|---|---|---|---|---|
| 4,186,334 A | * | 1/1980 | Hirata ................ 318/805 |
| 4,251,735 A | * | 2/1981 | Coleman ................ 363/95 |
| 4,684,873 A | | 8/1987 | Glennon | |
| 4,905,134 A | * | 2/1990 | Recker et al. ............ 363/98 |
| 5,068,590 A | * | 11/1991 | Glennon et al. ........... 322/10 |
| 5,077,485 A | | 12/1991 | Rashid | |
| 5,317,500 A | * | 5/1994 | Iden et al. .............. 363/98 |
| 5,325,043 A | | 6/1994 | Parro | |
| 5,329,222 A | * | 7/1994 | Gyugyi et al. ........... 323/307 |
| 5,384,527 A | * | 1/1995 | Rozman et al. ........... 322/10 |
| 5,428,283 A | * | 6/1995 | Kalman et al. .......... 318/729 |
| 5,463,300 A | | 10/1995 | Oximberg | |
| 5,495,163 A | * | 2/1996 | Rozman et al. ........... 322/10 |
| 5,541,488 A | | 7/1996 | Bansal et al. | |
| 5,587,647 A | | 12/1996 | Bansal et al. | |
| 5,905,644 A | * | 5/1999 | Blasko et al. ............ 363/41 |
| 5,986,419 A | * | 11/1999 | Archer et al. ........... 318/254 |
| 6,326,750 B1 | * | 12/2001 | Marcinkiewicz .......... 318/437 |

* cited by examiner

Primary Examiner—Rajnikant B. Patel
(74) Attorney, Agent, or Firm—William J. Zak, Jr. Esq.

(57) ABSTRACT

A system includes a permanent magnet generator, a dc link, an inverter coupled between the generator and the dc link, and a control for the inverter. The control regulates dc link voltage by adjusting the load angle and voltage magnitude of inverter ac terminal voltage with respect to emf of the machine.

21 Claims, 2 Drawing Sheets

PERMANENT MAGNET GENERATOR AND GENERATOR CONTROL

BACKGROUND OF THE INVENTION

The present invention relates to electrical machines. More specifically, the present invention relates to a permanent magnet generator.

Many aircraft include high-speed electrical generators for generating power during flight. Ac power is generated and rectified to dc power, and the dc power is supplied through a dc distribution system to on-board electronics such as radar, vapor cycle compressors, flight control electronics and electromechanical/electrohydrostatic actuators. The electrical generators may be wound field synchronous machines, switched reluctance machines, permanent magnet machines, or other types of machines. For high-speed applications, a so-called "Two Pole Toothless" permanent magnet machine is desirable because of its robust rotor design and a low magnetic spring rate associated with a large air gap.

Despite their advantages, permanent magnet machines are not preferred for aircraft generator application because they could not survive short circuits applied to their terminals. Because of their low impedance, short circuit currents in excess of the machine current rating can flow under short circuit applications, causing excessive heat build up in the machine stator windings. A short in the stator windings can literally melt the windings and destroy a machine. If a machine cannot survive the short circuit conditions, it cannot recover upon short circuit removal, and it cannot deliver power to the aircraft.

There is a need for a high-speed permanent magnet generator that can gracefully survive short circuit conditions.

SUMMARY OF THE INVENTION

According to one aspect of the present invention, a system includes a permanent magnet machine; a dc link; and a control including an inverter coupled between the dc link and the terminals of the machine. The control regulates dc link voltage by adjusting the load angle and the magnitude of the inverter ac terminal voltage with respect to the emf of the machine.

A machine having a high reactance will not become damaged if its windings are shorted during full-speed operation, since the machine is designed such that the thermal ratings under both short circuit and rated power conditions are essentially identical. Because such a permanent magnet machine can "gracefully" survive shorts, it can be used, in conjunction with the control system and its associated inverter, to generate dc electrical power for use on aircraft.

DETAILED DESCRIPTION OF THE INVENTION

Figure 1:
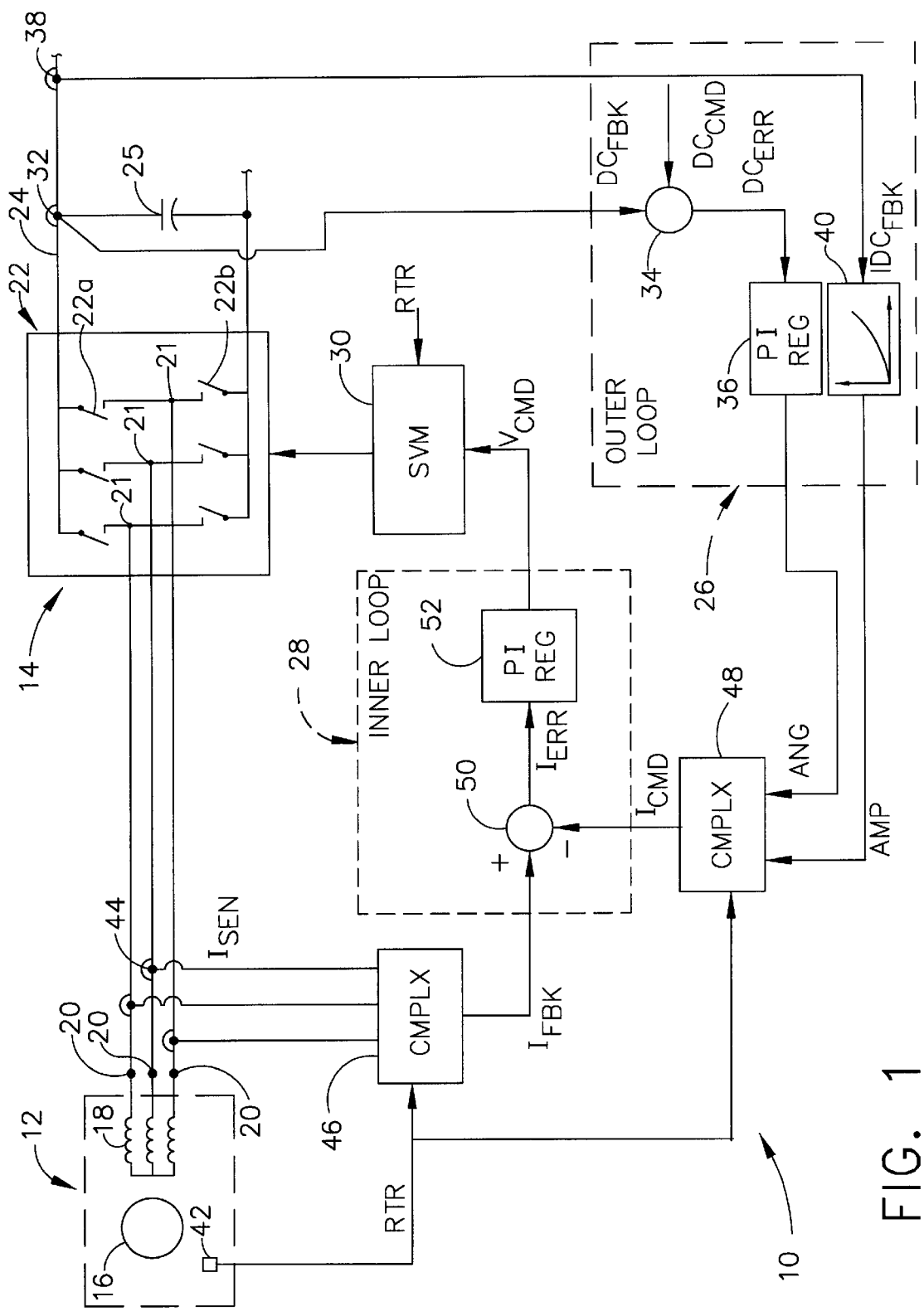
FIG. 1 is an illustration of a system including a permanent magnet generator and a generator control.

Referring to FIG. 1, a system 10 includes a permanent magnet electrical generator 12 and a generator control 14.

The generator 12 includes a permanent magnet rotor 16 and three-phase stator windings 18. The windings 18 are terminated at generator terminals 20. The stator windings 18 have a reactance of one per-unit. As a result, when the generator 12 becomes shorted, the current flowing through the windings 18 (the "short circuit current") becomes equal to rated current of the windings 18. Thus, the short circuit current is limited to one per-unit current. With the generator 12 thermally designed for one-per unit current, short circuit currents will not damage the windings 18 (since the machine is designed such that the thermal ratings under both short circuit and rated power conditions are essentially identical).

The control 14 includes an inverter 22 coupled between the generator terminals 20 and a dc link 24. The inverter 22 may be a three-phase bridge inverter. Such an inverter 22 includes six switches: a set of upper switches 22a and a set of lower switches 22b. Each switch 22a and 22b of the inverter 22 includes a controllable solid-state device (e.g., an IGBT, a MOSFET) and an anti parallel diode (not shown) across the solid-state device. A dc link capacitor 25 is coupled across the dc link 24 to produce a low source impedance for the inverter, and to reduce voltage ripple on the dc link 24.

The voltage generated behind the reactance 18 of the generator 12 (the so called "back emf") will be referred to as the generator voltage or generator emf. The voltage at the terminals 21 of the inverter 22 will be referred to as the inverter terminal voltage.

Figure 2:
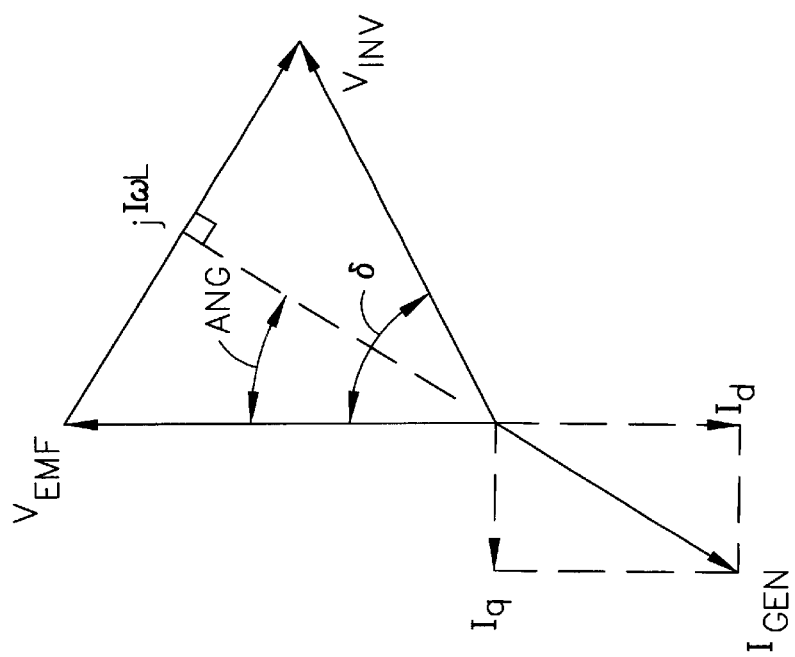
FIG. 2 is a vector diagram of load angle between generator voltage and inverter terminal voltage.

Reference is now made to FIG. 2, which shows a vector diagram of generator and inverter voltages. Park vectors inherently contain information on both the instantaneous magnitudes and the phase relationship of three phase rotating fields with respect to a reference coordinate system. A Park vector, in general, is a mathematical representation that describes the locus of an electrical quantity in the complex space domain (where time is a parameter). A voltage Park vector is defined with the vector's amplitude and the vector's direction in spatial relation to the three phases. A general discussion of Park vectors is provided in P. K. Kovacs, "Transient Phenomena in Electrical Machines," Elsevier Science Publishing Co. (1984).

The inverter terminal voltage and generator voltage (or generator emf) are represented by voltage Park vectors $V_{EMF}$ and $V_{INV}$, respectively. The angle between the generator voltage Park vector $V_{EMF}$ and the inverter terminal voltage Park vector $V_{INV}$ is referred to as the load angle $\delta$. The vector $j I \omega_L$ closes the vector diagram, since the sum of the voltage vectors comprising the generator voltage, inverter terminal voltage, and the voltage drop across the generator impedance must sum to zero when the small resistive drop of the machine winding is neglected.

The generator current is represented by a current Park vector $I_{GEN}$. The angle between the generator current Park vector $I_{GEN}$ and the generator emf Park vector $V_{EMF}$ is referred to as the control angle ANG.

Selecting the generator voltage Park vector as the reference vector, this vector will always lie on the real axis. Real power on the dc link 24 is the product of the inverter voltage $V_{INV}$ and the component of generator current $I_{GEN}$ that is in phase with the inverter voltage. Real power may be controlled by varying the load angle $\delta$ and the amplitude of the inverter terminal voltage. Magnitude of the inverter terminal voltage is varied according to dc current.

Reactive power is equal to the product of the quadrature component of the generator current $I_{GEN}$ and the inverter terminal voltage. The quadrature component of the generator current is equal to the product of $I_{GEN}$ and $\sin(\delta - ANG)$.

If the dc link voltage falls below a desired value, the control angle ANG is increased. This, in turn, causes the load angle δ to be increased. Increasing the load angle δ causes the length of the generator current Park vector $I_{GEN}$ to be lengthened. As a result, real and reactive power are increased.

Returning to FIG. 1, the control 14 further includes an outer loop 26, an inner loop 28 and space vector modulation (SVM) logic 30 for adjusting the load angle and voltage magnitude of the inverter ac terminal voltage with respect to the emf of the generator 12. The amplitude of the inverter terminal voltage vector and the load angle of this vector are computed in the inner loop 28

The outer loop 26 receives a dc link voltage command $DC_{CMD}$ and a dc link voltage feedback signal $DC_{FBK}$. The dc link voltage command $DC_{CMD}$ specifies the desired voltage on the dc link 24, usually a fixed value, equal to the rated or desired value. In many aircraft applications, the commanded dc link voltage $DC_{CMD}$ is typically either 28 volts or 270 volts. The voltage feedback signal $DC_{FBK}$ is provided by a dc link voltage sensor 32.

A summing junction 34 determines the error $DC_{ERR}$ as a difference between commanded and measured dc link voltage ($DC_{CMD}-DC_{FBK}$). This error is operated upon by a proportional integral regulator 36, whose output is the angle ANG. This regulator 36 has appropriate limits associated with it: zero and −90 degrees. If the measured dc link voltage $DC_{FBK}$ is less than the commanded dc link voltage $DC_{CMD}$, the commanded angle ANG is increased. If the dc link voltage is larger than commanded, the commanded angle ANG is reduced.

A load current sensor 38 generates a feedback signal $IDC_{FBK}$ indicating current on the dc link 24. A non-linear function generator 40 translates the load current signal $IDC_{FBK}$ to a signal AMP representing an equivalent ac current peak value, which will be used as a machine current amplitude reference. Referring additionally to FIG. 2, the load current signal $IDC_{FBK}$ may be translated to the machine current amplitude reference AMP as follows:

$$AMP = \sqrt{\left(\frac{V_{INV} - V_{EMF}\cos\delta}{\omega L}\right)^2 + \left(\frac{V_{DC}IDC_{FBK}}{3V_{INV}}\right)^2}$$

Omega (ω) is proportional to the speed of the machine, and the number of pairs of poles in the machine: ω=2*PI* (pairs of poles)*speed. This computation should be done in real time, otherwise a different look-up table would be required for each speed. L is the machine inductance.

A rotor position sensor 42 generates a signal RTR indicating rotor position. The position sensor is aligned such that the unit vector exp(jRTR) is in phase with the generator voltage vector $V_{EMF}$. The rotor position signal RTR provides the position reference for the machine emf. Two ac current sensors 44 generate signals $I_{SEN}$ indicating current sensed at the generator terminals 20.

A first block 46 combines the sensed current signals $I_{SEN}$ to form a current Park vector in the stationary reference frame, which is then transformed to the synchronous reference frame (with respect to the rotor 16) using the unit vector exp(−jRTR). The current feedback vector $I_{FBK}$ so formed is supplied to the inner loop 26.

The current Park vector may be converted from a stationary frame to a synchronous frame by extracting a unit amplitude Park vector, $e^{jRTR}$, from the rotor position signal RTR (e.g., by computing the function cos (RTR)4-j sin (RTR)) and taking the product of the current Park vector and a complex conjugate, $e^{-jRTR}$, of the unit amplitude Park vector. The synchronous current Park vector $I_{FBK}$ is synchronous with respect to the rotor 16. The unit amplitude Park vector is represented by a complex number in polar coordinates (or as a+ib in Cartesian coordinates) from which the complex conjugate, $e^{-jRTR}$, of the unit amplitude Park vector is determined.

A second block 48 combines the amplitude magnitude signal AMP and the load angle signal ANG to produce a vector-based current command ($AMPe^{-jANG}$) from the signals ANG and AMP indicating load angle and amplitude. Thus, the load angle signal ANG provides the angle-portion of the vector-based current-command, and the current peak value represents the amplitude portion of the vector-based current command. An output of the second block 48 supplies the current command $I_{CMD}$ so formed to the inner loop 26.

The inner loop 28 includes a comparator 50, which subtracts the feedback current vectors $I_{FBK}$ from the current command $I_{CMD}$ to produce an error vector $I_{ERR}$. A vector-based PI-type current regulator 52, with appropriate amplitude limits, converts the error vector $I_{ERR}$ into a voltage vector command $V_{CMD}$ in the synchronous reference frame. The voltage vector command VCMD represents the voltage amplitude and the load angle of the inverter terminal voltage The amplitude limits are established by the inverter duty cycle range for the desired dc link voltage.

By controlling both the current amplitude and the associated commanded angle ANG, the machine current can be minimized for any applied load on the dc link 24.

The SVM logic 30 converts the voltage vector command $V_{CMD}$ back into the stationary reference frame (e.g., by taking a product of the voltage command $V_{CMD}$ and the unit amplitude Park vector $e^{jRTR}$) and uses space vector modulation to turn on and off the switches 22a and 22b of the inverter 22. The six switches 22a and 22b of the inverter 22 are modulated at a high frequency (e.g., 40 kHz) in order to minimize the size of the dc link capacitor 25.

Figure 3:
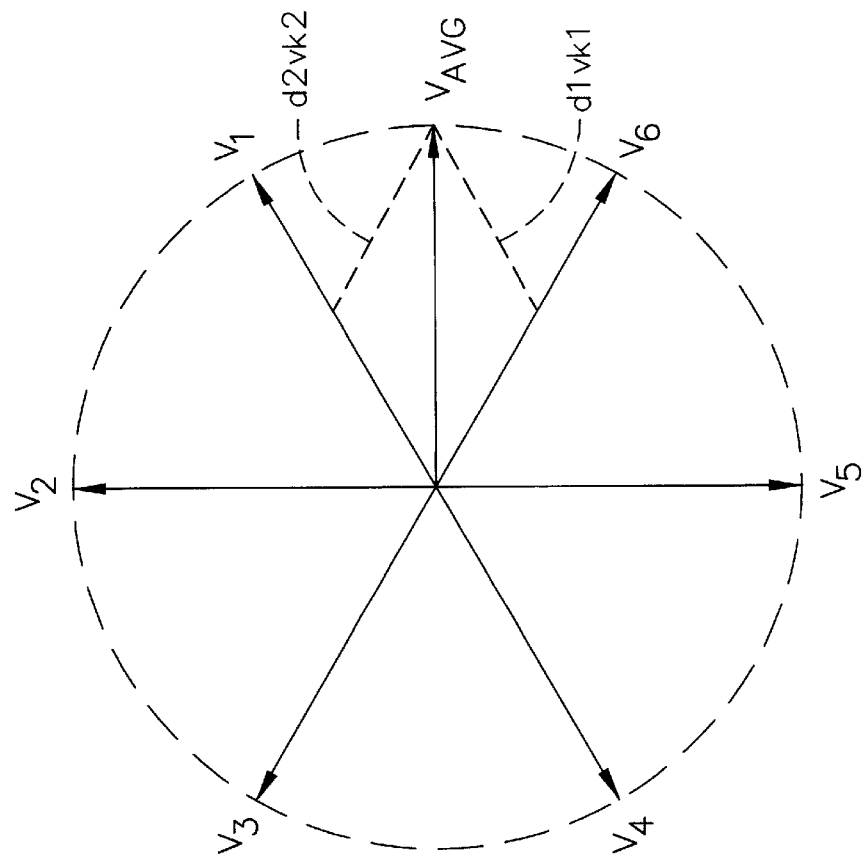
FIG. 3 is a vector diagram for current mode SVM control.

Reference is now made to FIG. 3, which illustrates the space vector modulation. The SVM logic selects inverter switches 22a and 22b that create a rotating vector Vavg. The rotating vector Vavg produces a sinusoidal voltage that best matches the inverter voltage commanded by the current regulator output Vinv. Typical SVM algorithms may be used to compute duty cycles (d1 and d2) and select the appropriate voltage vectors (V1, V2, V3, V4, V5, and V6) or the null vector so that the space-averaged vector produced (d1vk1+d2vk2) approximates the commanded vector (Vavg).

Thus disclosed is a permanent magnet generator that can gracefully survive short circuit conditions. Such a permanent magnet generator and control may be used to generate dc power in aircraft. Further, short circuit current can be supplied by such a system without exceeding rated current for the generator and the inverter.

Although the system is described in connection with three-phase ac power, it is not so limited. For instance, the system may utilize two-phase ac power The controller 14 may be implemented in software, hardware or any combination thereof.

Values for the regulators 36 and 52 are application-specific. The regulator values are dependent upon desired responses of the control 14 and other system constraints and inputs.

The present invention is not limited to the specific embodiment described above. Instead, the present invention is construed according to the claims that follow.

What is claimed is:

1. A system comprising:
   a permanent magnet machine;
   a dc link; and
   a control for regulating dc link voltage, the control including an inverter having ac terminals coupled to the machine, the control adjusting load angle and magnitude of inverter ac terminal voltage with respect to emf of the machine.

2. The system of claim 1, wherein the machine includes stator windings coupled to the ac terminals of the inverter, the stator windings having a reactance of at least one per unit.

3. The system of claim 1, wherein the machine includes stator windings coupled to the ac terminals of the inverter, rated current of the stator windings being at least equal to short circuit current during full-speed operation of the machine.

4. The system of claim 1, wherein the load angle is taken as the angle between a Park vector representing machine emf and a Park vector representing the ac terminal voltage.

5. The system of claim 1, wherein the control generates a vector-based current command as a function of load angle and a machine current amplitude reference; wherein the control generates a feedback current vector representing sensed current flowing through stator windings of the machine, the current vector and the current command being synchronous with respect to rotor angle of the machine; and wherein the control generates a voltage command for modulating the inverter, the voltage command being derived from the vector-based current command and the feedback current vector.

6. The system of claim 5, wherein the control generates the current vector command from a commanded angle and machine current amplitude reference, the control determining the machine current amplitude reference by measuring the dc link current and deriving the amplitude in proportion to the measured dc link current.

7. The apparatus of claim 6, wherein the commanded angle is taken as a PI-regulated difference between sensed and commanded dc link voltage; whereby load angle is increased when the difference between commanded and sensed dc link voltage is increased; and whereby load angle is reduced when the difference between commanded and sensed dc link voltage is reduced.

8. The system of claim 6, wherein the control includes a non-linear function generator for deriving the machine current amplitude reference from the measured dc link current.

9. The system of claim 5, wherein the control uses the voltage command to perform space vector modulation of the inverter.

10. A system comprising:
    a permanent magnet machine including stator windings and a rotor, rated current of the windings being at least equal to current flowing through the windings during short circuit conditions;
    a dc link; and
    means for regulating dc link voltage by adjusting load angle and voltage magnitude of inverter ac terminal voltage with respect to emf of the machine.

11. Apparatus for a permanent magnet machine, the apparatus comprising:
    an inverter; and
    an inverter control for regulating dc link voltage by determining load angle with respect to emf of the machine, determining magnitude of current flowing through the stator windings, and using the load angle and the determined current magnitude to modulate the inverter.

12. The apparatus of claim 11, wherein the load angle is taken as the angle between a Park vector representing machine emf and a Park vector representing inverter ac terminal voltage.

13. The apparatus of claim 11, wherein the control generates a vector-based current command as a function of commanded angle and a machine current amplitude reference; wherein the control generates a feedback current vector representing sensed machine current, the current vector and the current command being synchronous with respect to rotor angle of the machine; and wherein the control generates a voltage command for modulating the inverter, the voltage command being derived from the vector-based current command and the feedback current vector.

14. The apparatus of claim 13, wherein the control determines the machine current amplitude reference by measuring the dc link current and deriving the amplitude in proportion to the measured dc link current.

15. The apparatus of claim 14, wherein the control includes a non-linear function generator for deriving the machine current amplitude reference from the measured dc link current.

16. The apparatus of claim 13, wherein the control determines the commanded angle as a PI-regulated difference between sensed and commanded dc link voltage.

17. The apparatus of claim 13, the control uses the voltage command to perform space vector modulation of the inverter.

18. A method of using an inverter to provide power on a dc link, the inverter receiving power from an ac generator, the method comprising:
    determining a load angle from measured and commanded dc link voltage;
    generating a vector-based current command from the load angle, the current command being synchronous with respect to the machine emf;
    generating a feedback current vector of ac generator current, the feedback current vector being synchronous with respect to the machine emf;
    generating a voltage command from the current command and the feedback current vector; and
    using the voltage command to modulate the inverter.

19. The method of claim 18, wherein the vector-based current command is generated as a function of commanded angle and a machine current amplitude reference; and wherein the feedback current vector is generated from sensed machine current.

20. The method of claim 19, wherein the machine current amplitude reference is determined by measuring the dc link current and deriving the amplitude in proportion to the measured dc link current.

21. A system comprising:
    a permanent magnet machine;
    a dc link; and
    a control for regulating dc link voltage, the control including an inverter having ac terminals coupled to the machine, the control adjusting load angle and magnitude of inverter ac terminal voltage with respect to emf of the machine;
    the control further including a current loop for eliminating dc current in the inverter.

* * * * *